(12) United States Patent
Roche, Jr.

(10) Patent No.: US 6,927,769 B2
(45) Date of Patent: Aug. 9, 2005

(54) STEREOSCOPIC IMAGE PROCESSING ON A COMPUTER SYSTEM

(75) Inventor: Michael L. Roche, Jr., Pomona, NY (US)

(73) Assignee: VRex, Inc., Elmsford, NY (US)

(*) Notice: Subject to any disclaimer, the term of this patent is extended or adjusted under 35 U.S.C. 154(b) by 249 days.

(21) Appl. No.: 09/996,421

(22) Filed: Nov. 20, 2001

(65) Prior Publication Data

US 2002/0105514 A1 Aug. 8, 2002

Related U.S. Application Data

(60) Provisional application No. 60/252,175, filed on Nov. 21, 2000.

(51) Int. Cl.[7] .............................................. G06T 15/00
(52) U.S. Cl. ...................... 345/419; 345/629; 345/646; 345/58; 352/57; 348/262
(58) Field of Search ................................. 345/419, 629, 345/646, 58; 352/57, 60, 62; 348/262

(56) References Cited

U.S. PATENT DOCUMENTS 5,719,598 A * 2/1998 Latham ...................... 345/419
6,590,573 B1 * 7/2003 Geshwind ................... 345/419

* cited by examiner

*Primary Examiner*—Kimbinh T. Nguyen
(74) *Attorney, Agent, or Firm*—Gerow D. Brill (57) ABSTRACT

A preferred embodiment of the invention permits a user to load two images into a computer system so that two images may be combined into a stereoscopic image pair. An additional embodiment permits a user to load a single 2D image into the system to be combined into a stereoscopic image pair. An additional embodiment permits a user load a single 2D image to be loaded into a computer to be morphed into a stereoscopic image pair. The term "morphing is derived from the term metamorphis. Morphing refers to the process of gradually changing one visual image to another or merging two or more images into a single image.

2 Claims, 11 Drawing Sheets

STEREOSCOPIC IMAGE PROCESSING ON A COMPUTER SYSTEM

This application claims the benefit of provisional application No. 60/252,175, filed Nov. 21, 2000.

BACKGROUND OF INVENTION

The present invention relates to stereoscopic image processing on a computer system. In particular the system permits a user to create a stereoscopic display from a 2D image or manipulate two images into a stereoscopic display of the two images.

SUMMARY OF THE INVENTION

A preferred embodiment of the invention permits a user to load two images into a computer system so that two images may be combined into a stereoscopic image pair. An additional embodiment permits a user load a single 2D image to be loaded into a computer to be morphed into a stereoscopic image pair. The term "morphing is derived from the term metamorphis. Morphing refers to the process of gradually changing one visual image to another or merging two or more images into a single image.

BRIEF DESCRIPTION OF THE DRAWINGS

For a more complete understanding of the invention the following detailed description of the Invention should be read in conjunction with the accompanying Drawings, wherein.

DETAILED DESCRIPTION

Figure 1:
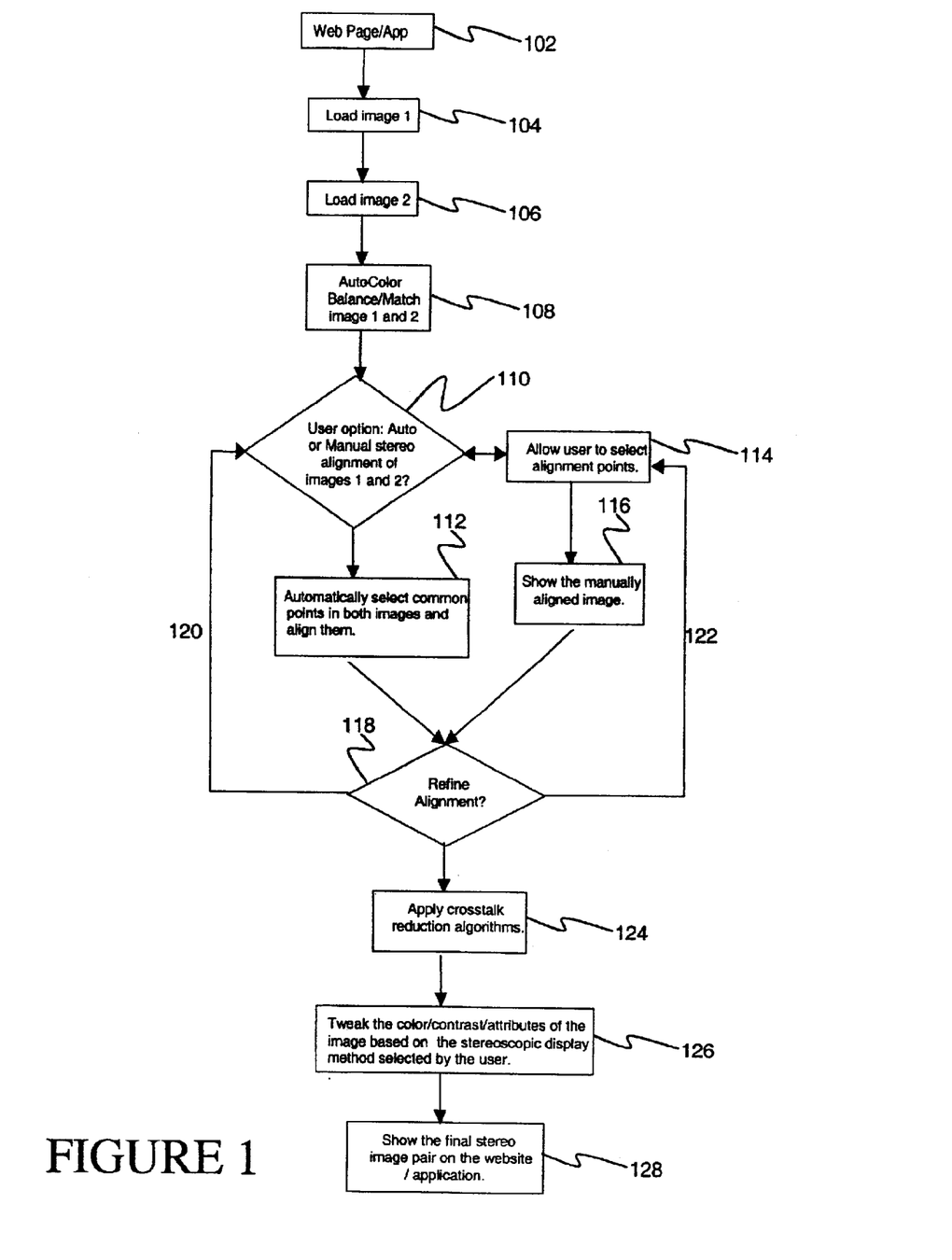
FIG. 1 illustrates a preferred embodiment wherein two images are combined into a stereoscopic pair.

A preferred embodiment of the invention, as illustrated in FIG. 1, permits a user to load two images into a computer system so that two images may be combined into a stereoscopic image pair. The process begins by first accessing a web page or application software containing the software to combine the two images 102. Images may be loaded from an internal server, from the end user's computer or from another location or device that is connected to the Internet.

Image #1 and Image #2 104 and 106 are loaded into computer containing the software or the web page connection. End users can start by using images that are stored on the remote server along with the web pages, server code, etc. Additionally, the images may be stored on any device that is connected to the Internet, and then loaded into the remote server for manipulation. The works in progress, or final images can be saved on the remote server, the end-user's computer or on any other device on the Internet.

An Auto-Color Balance/Match Process 108 is performed on the two images to have the color balance between the images.

The user then can select an option of an Automatic or Manual stereo alignment of the images 110. If the user selects the Automatic stereo alignment the system automatically select common points in each image and then align them as a stereoscopic image pair 112. The auto alignment system will adjust the stereo effect based upon placement of the zero parallax point and the desired viewing method. For example the negative and positive parallax for optimum viewing can be adjusted via projection or CRT. The disparity between the left and right fields will intentionally be greater on a CRT than projection. The algorithm will find the best alignment given the constraint or direction specified by the user.

Zero parallax is defined to mean a point that appears to be at the screen level. A negative parallax is point that appears to be out of the screen nearer the viewer and positive parallax is a point that appears to be into the screen and further from the viewer.

As an alternative, the user may use a manual alignment process where the user manually selects the alignment points 114. The manual alignment occurs by selecting a zero parallax registration point in both image one and image two. The software will align the two images according to their registration points. After the registration points are selected, the aligned result is displayed 116. If the stereo image pair by the manual process or the automatic process requires further alignment, the user may continue to adjust the points in either or both images.

A return loop permits the system to take the result from the refinement stage and process it though steps 110–112 or 110, 114, and 116 again to further refine the process.

The system takes the result from the refined alignment and applies certain cross talk reduction algorithms to reduce any cross talk between the images 124. As a final process the user may adjust the stereo image depending upon the type of display being used. One display system uses glasses that work on a shutter glass principle where each side of the glasses are switched on and off in time synchronization with the displayed image. A second type of display uses gray anaglyph approach with red and blue portions of the glasses. A third type is a color anaglyph approach also using red and blue portions of the glasses. Each of these display modes requires its own unique color and contrast attribute correction of the displayed image.

As a final step, the system displays the image for the viewer on the color monitor or other display device.

An additional embodiment permits a user to load a single 2D image into the system to be combined into a stereoscopic image pair.

An additional embodiment permits a user load a single 2D image to be loaded into a computer to be morphed into a stereoscopic image pair. The term "morphing is derived from the term metamorphis. Morphing refers to the process of gradually changing one visual image to another or merging two or more images into a single image. 3D Morphing will take one image and turn it into a stereoscopic image. Applying a depth map to the picture does this. Real-time modification of depth map will allow an iterative customization of a 2D image into a stereoscopic 3D image. Regions selected for positive or negative parallax will be morphed to round edges—this is in addition to the depth map. The additional morphing step helps to reduce the "cardboard cut-out" effect, which is often prevalent in 2D to stereoscopic 3D conversions.

Figure 2:
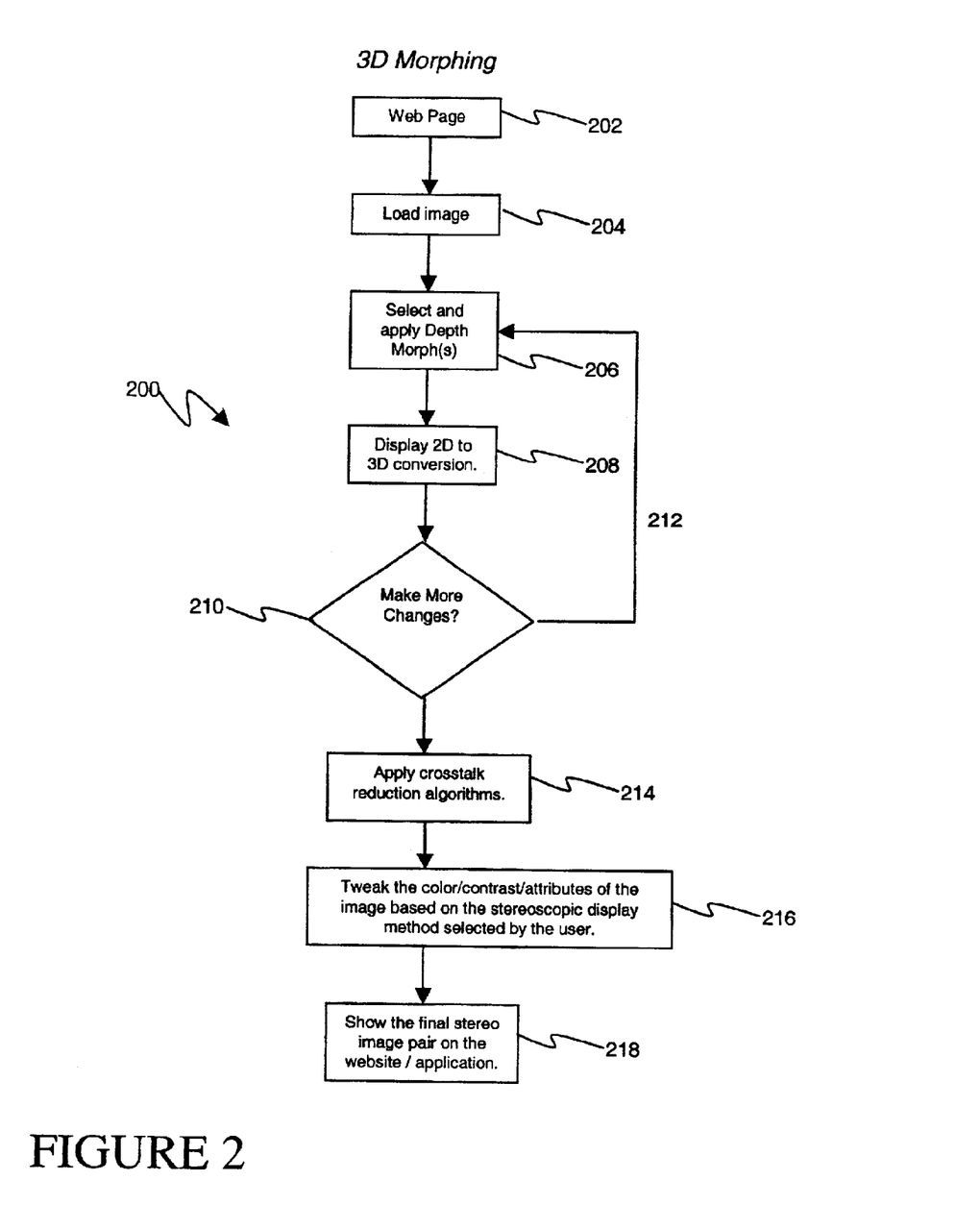
FIG. 2 illustrates the where a single 2D image is morphed into a stereoscopic pair.

The step-by-step process of 3D morphing is illustrated as 200 in FIG. 2. The user accesses the web page or computer program for stereoscopic production of an image 202. The single image to be processed is loaded 204. The user selects apply the Depth Morphs from a file 206. Preset Depth Maps for various picture types: portraits, etc. Depth Maps can be 256 color grayscale images. Selecting objects may also add depth from a scene and mapping them to a geometry object model. For example, the end user can use a marquee tool to select a standing person. That image data can then be mapped onto a cylinder or other similar geometric volume. The texture data would be interpolated to fix the selected volume. Selection of multiple such volumes will allow the end user to create multiple planes of depth. Auto-alignment will find a common point in each of the images and then align them as a stereoscopic image pair. This process may also be done with a single image create an illusion of depth.

Figure 3:
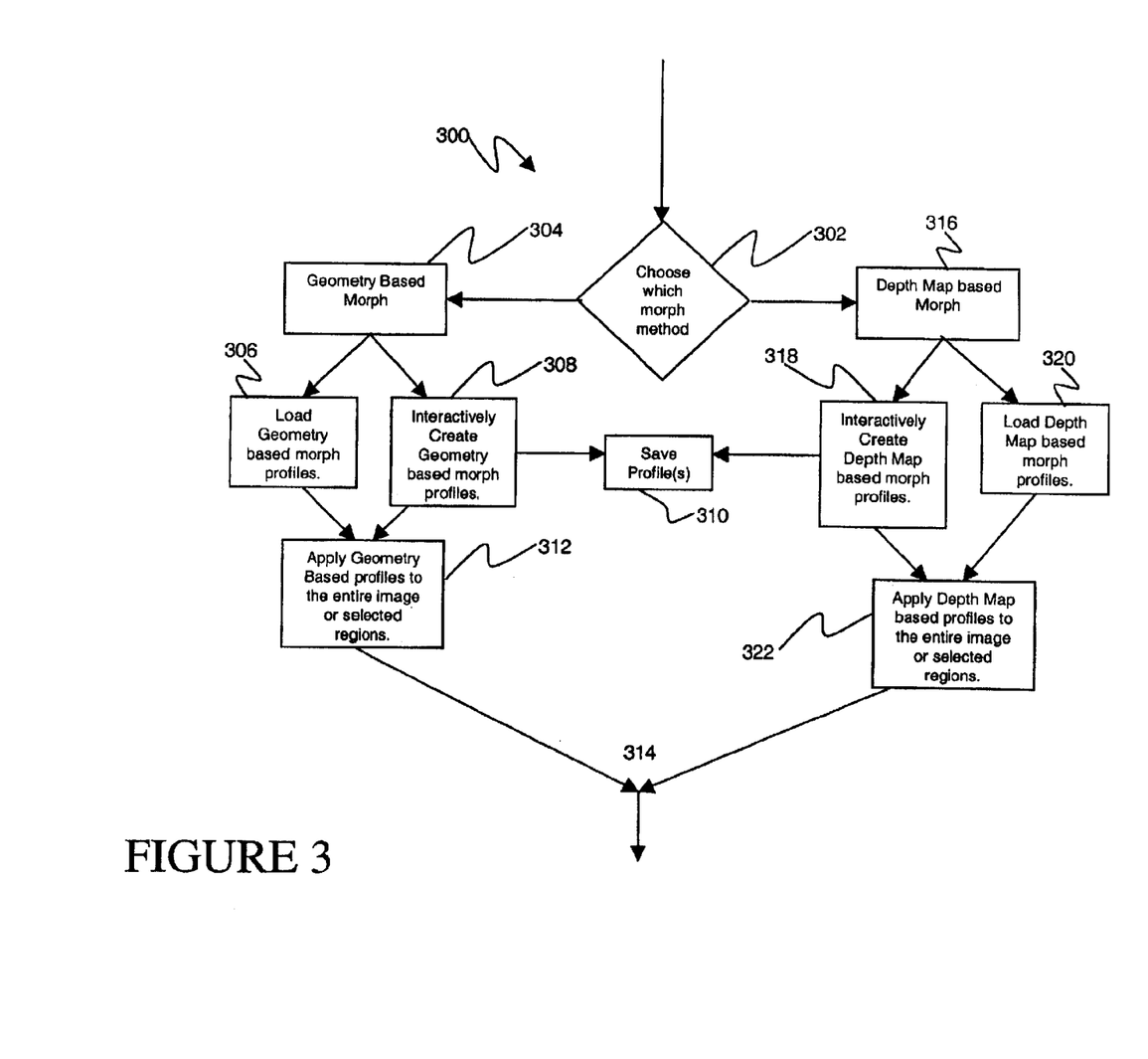
FIG. 3 illustrates details of the the selection and application of morphs.
Figure 4:
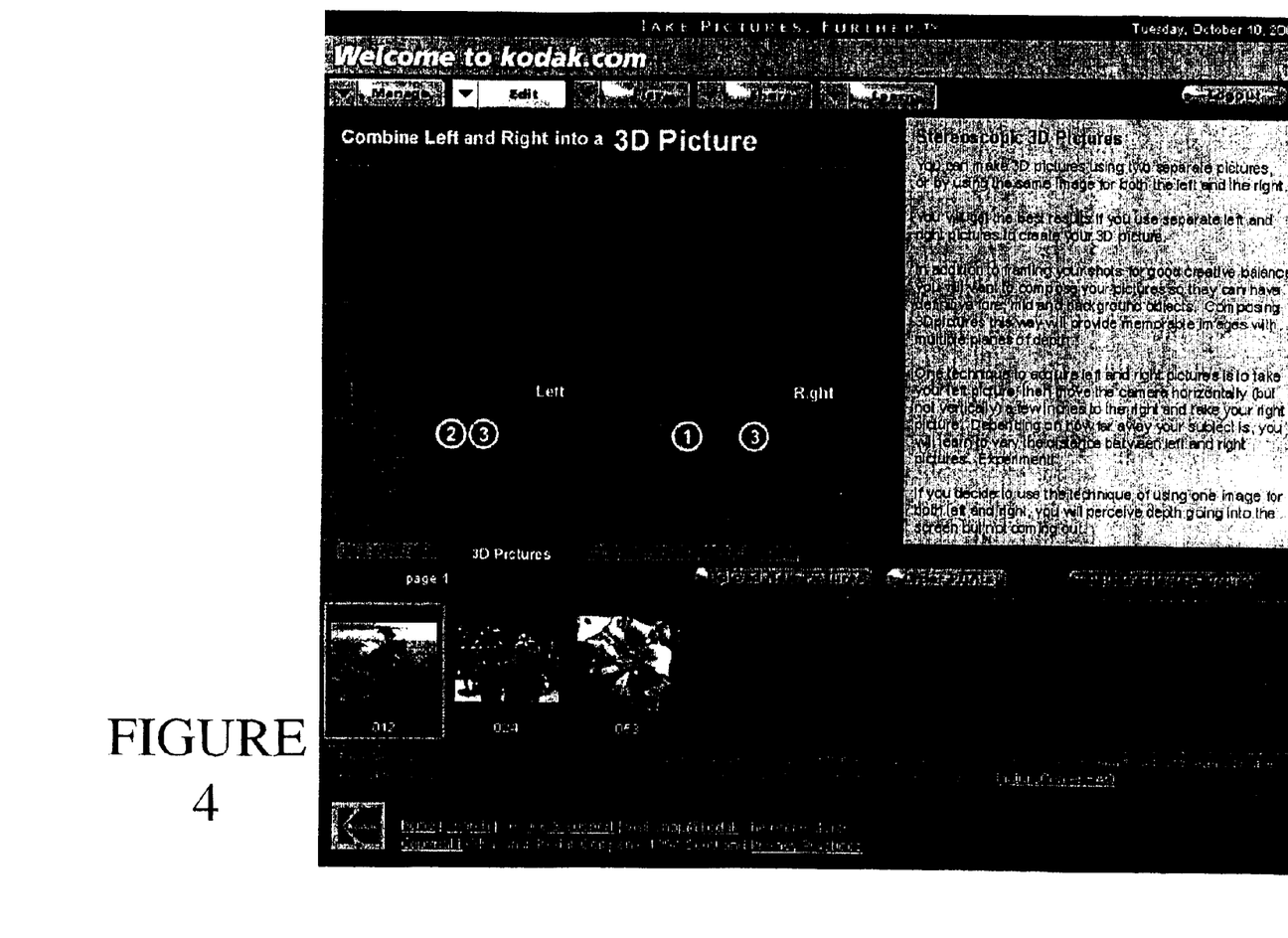
FIGS. 4–11 illustrate screen pictures showing the process of producing a stereoscopic image.

The Select and apply Depth Morphs step 206 may comprise either Geometry Based Morph 304 or a Depth Map based Morph 316 or a combination of them as illustrated in FIG. 3. The Geometry Based Morph path inputs the image Laod Geometry vased morph profiles section 306 and a Interactivel creat Geometry based morph profiles 308. The outputs of these two elements are coupled to a step of Applying Geometry based profiles to the entire image or selected regions.

The Depth Map Based Morph path includes similar functions of Interactively Creat Depth Map based om morph profiles 318 and Interactively Create Depth Map based profiles 318. these coupled to an Apply Depth Map based profiles to the entire image or selected regions 322. The user may selct from one of the profiles 312, 322 or from both.

The system displays the 2D to 3D conversion. The user may make manual adjustments similar to those in the two-image process described above. 210. Manual alignment can be done using one or two images. If only one image is to be used, then the singular will be used as the source for both left and right perspectives. Using a single image can often produce positive parallax, but not negative parallax. When two separate images are used for manual alignment the end result may contain either or both positive and negative parallax.

A feedback loop 212 is available to process the result of changes through the system again. The cross talk reduction algorithms 214 as described above are again applied to the 3d image. The operator again chooses the color/contrast attributes needed for the type of display desired as discussed in the two image format. Finally the final stereo image created from the single image 218.

The end user is able to take a 2D image and add multiple planes of depth. For example, with a picture of a face, the end user could select the nose, apply negative parallax (out of the screen), select the lips (set them at slightly negative parallax), select the eyes (apply positive parallax), select the ears (positive parallax), select the neck (positive parallax), etc. After making a selection the end user can control the depth map and vary the amount of positive or negative parallax in that selection.

Figure 5:
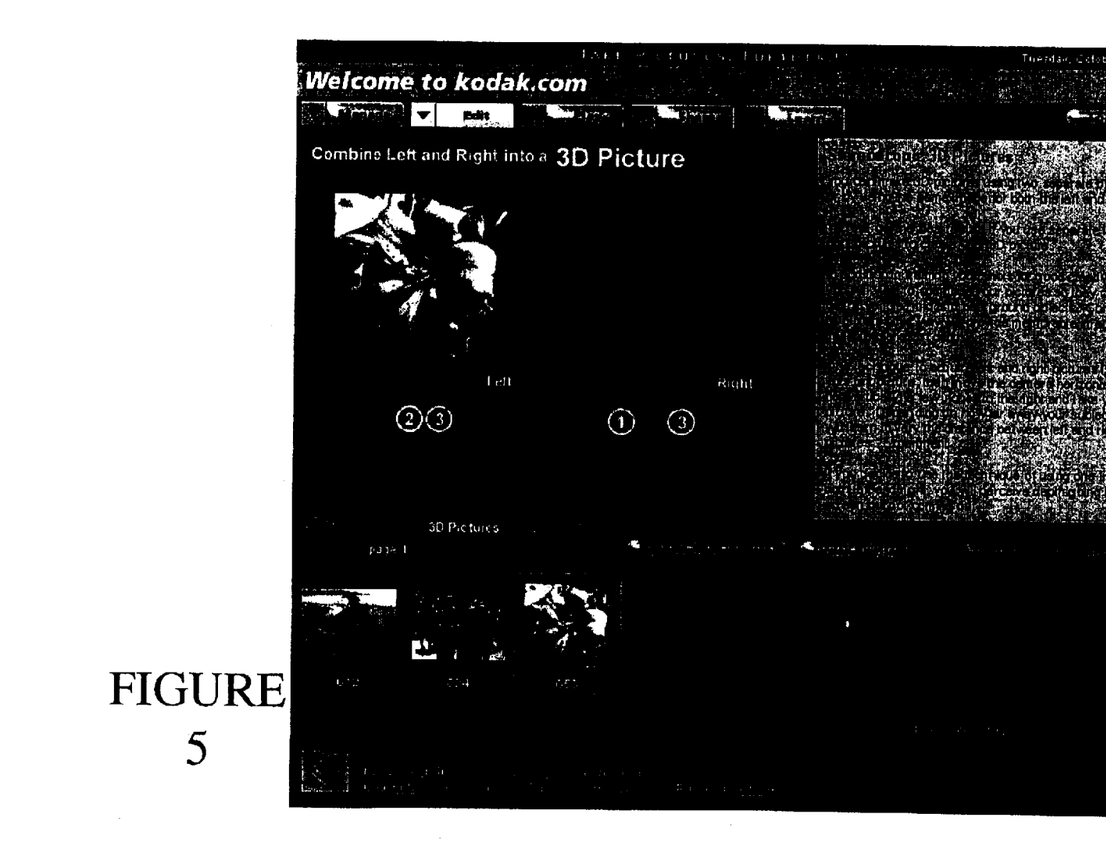
Figure 6:
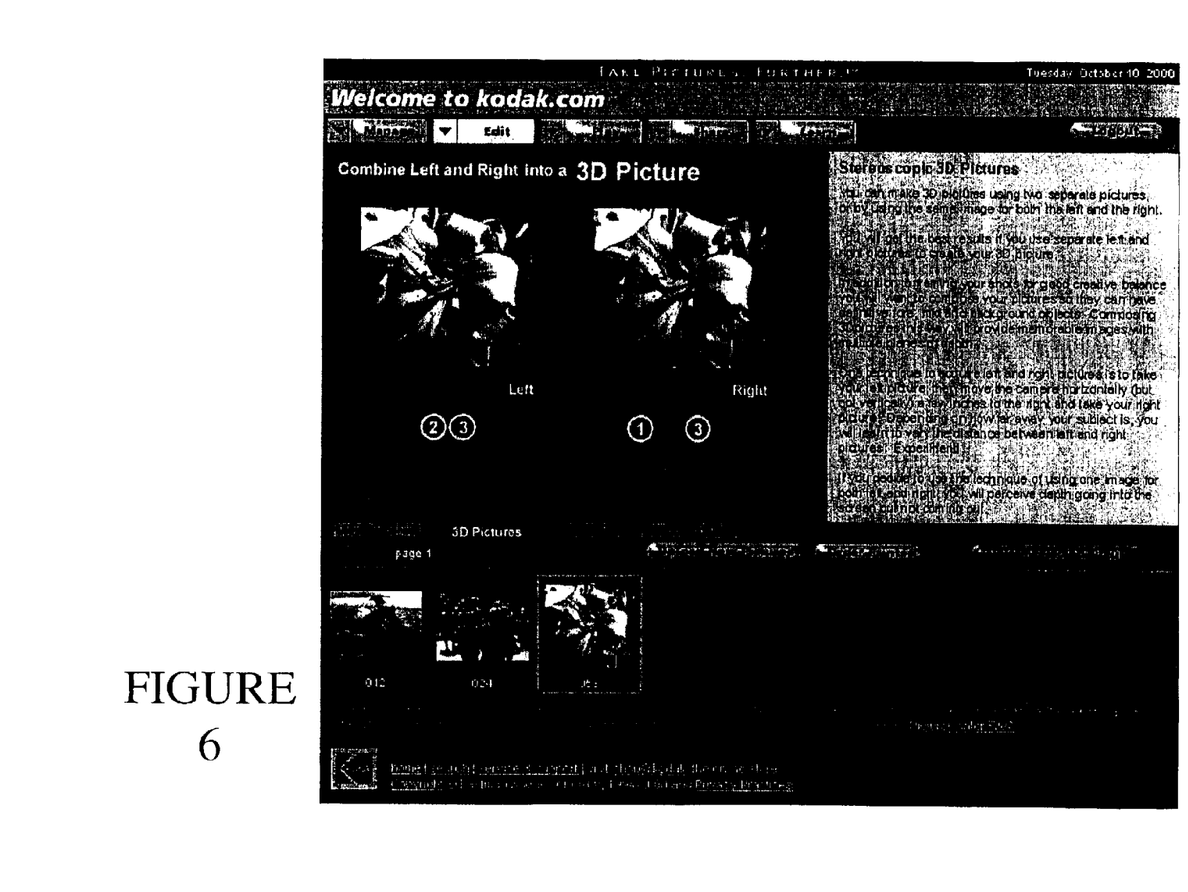
Figure 7:
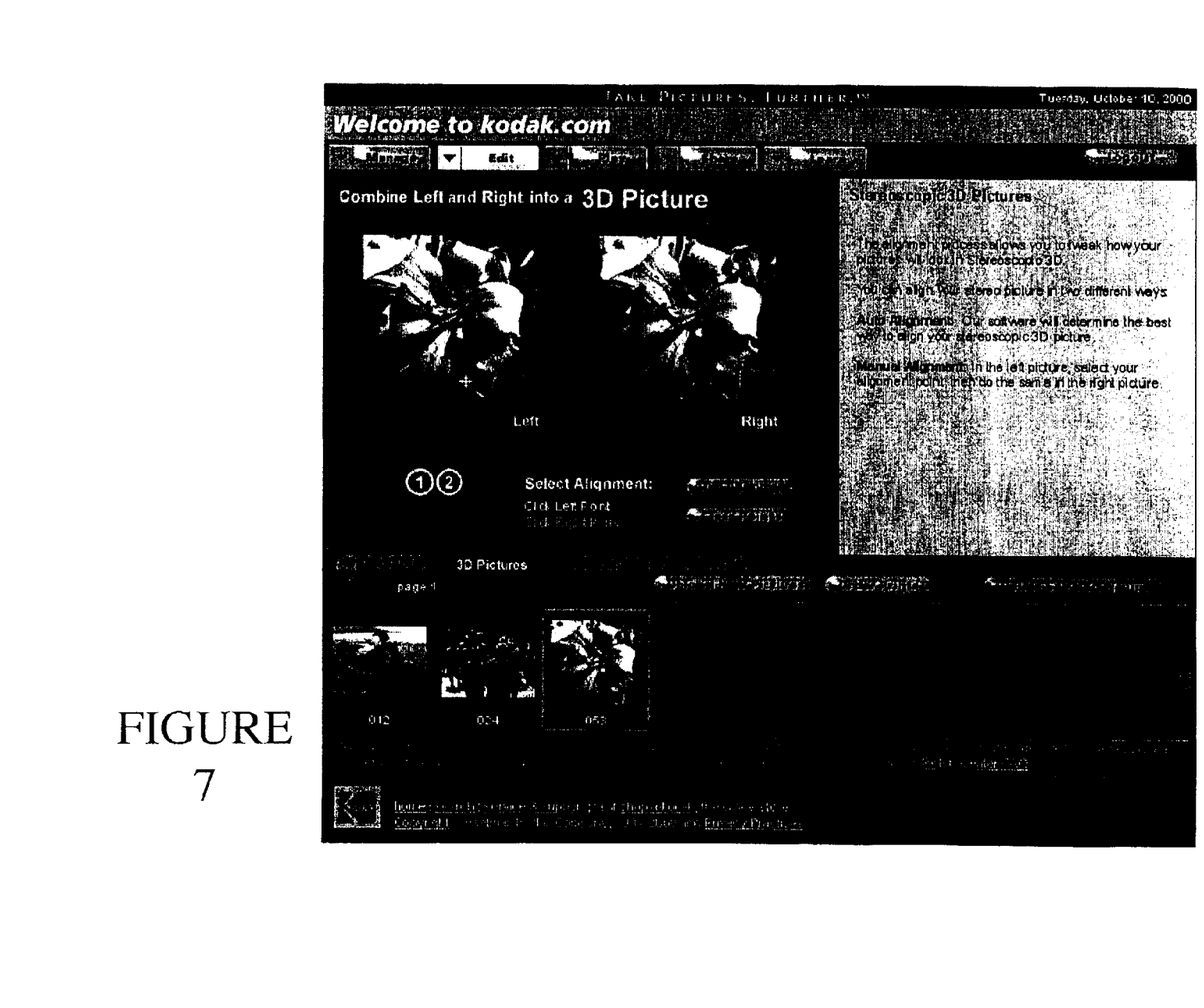
Figure 8:
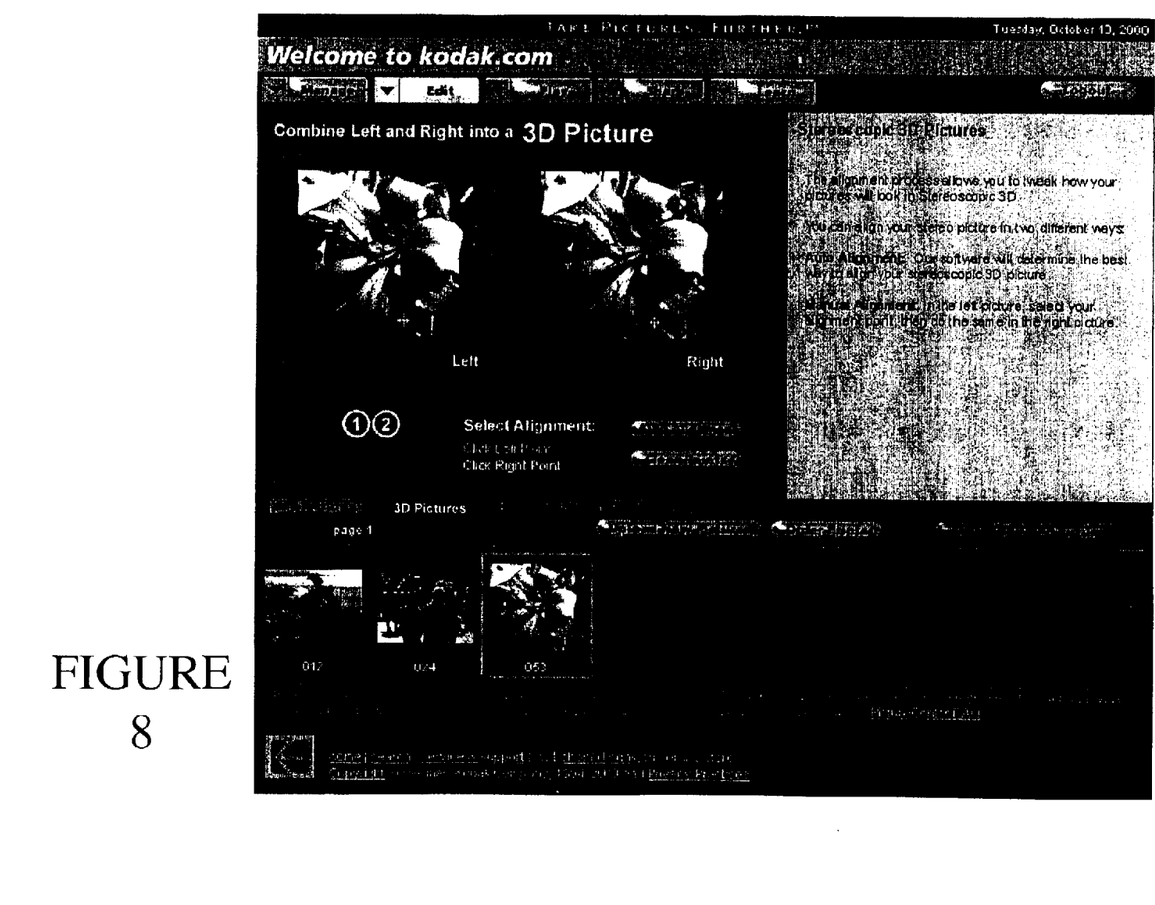
Figure 9:
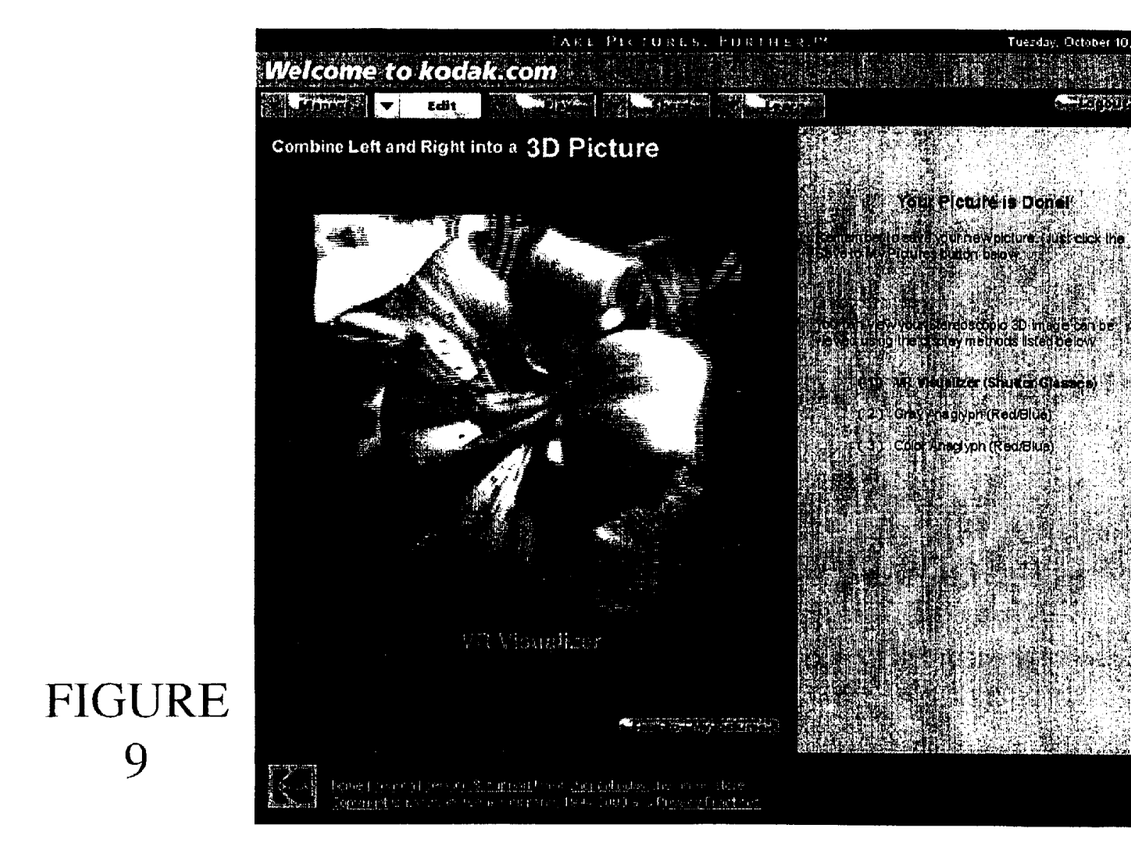
Figure 10:
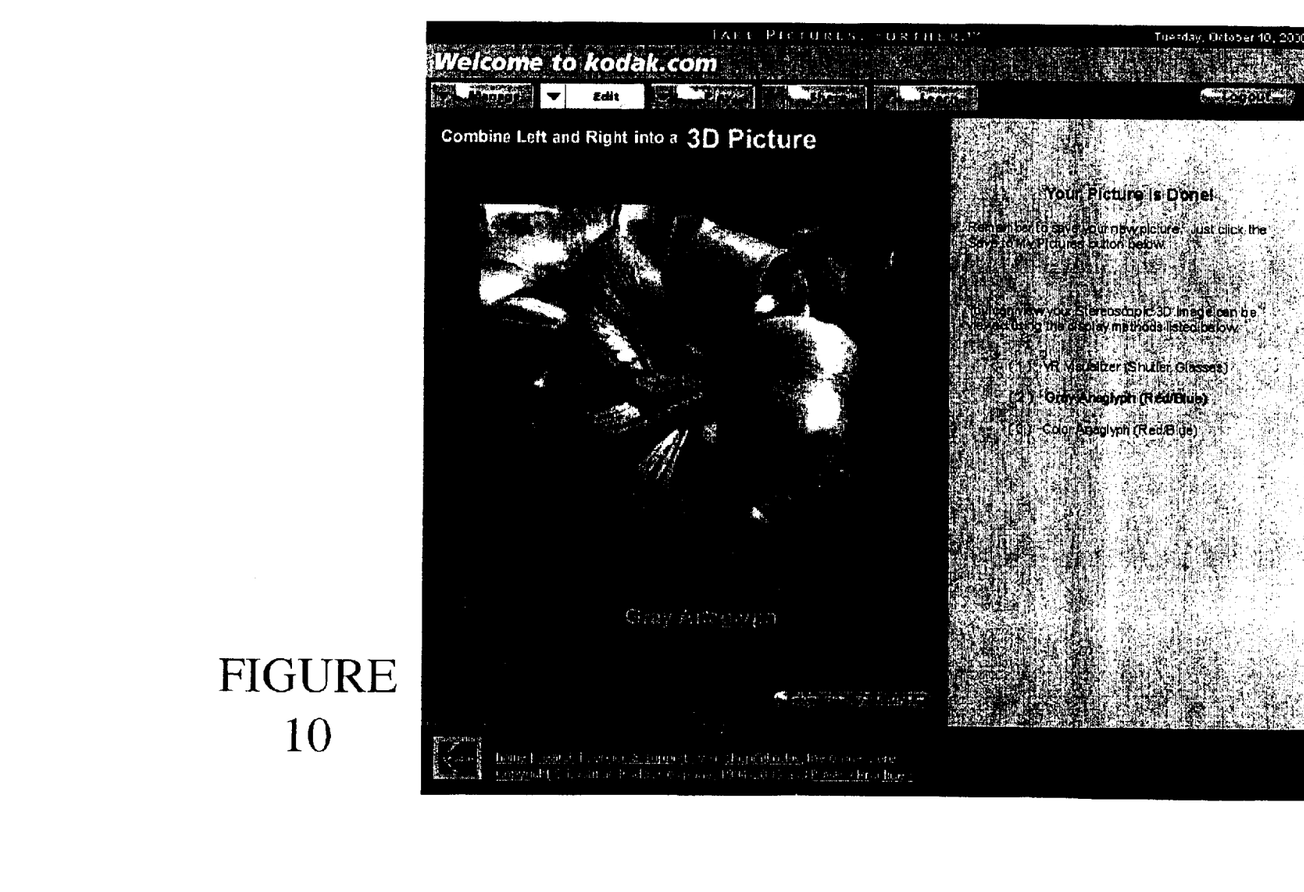
Figure 11:
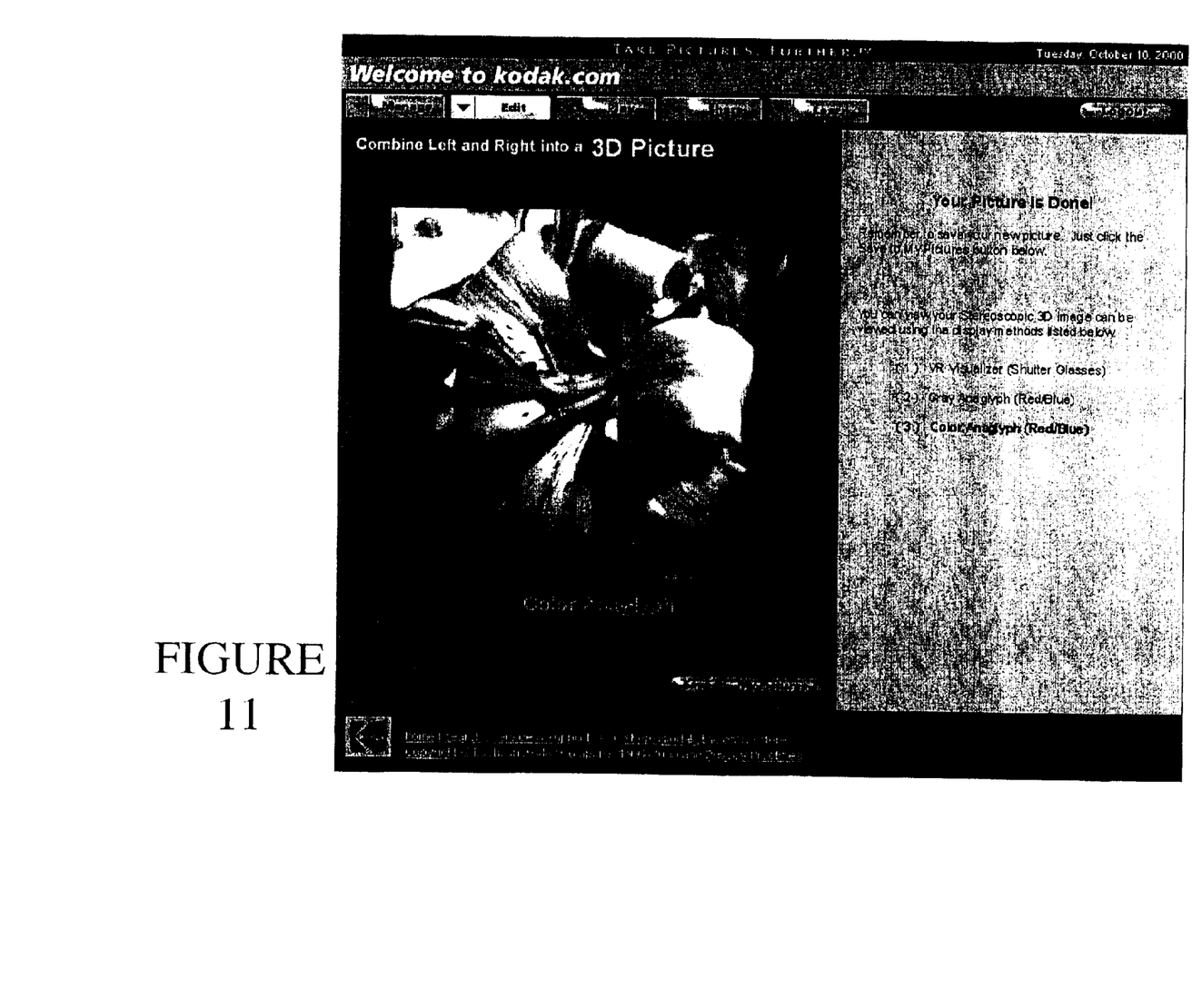

FIGS. 3–9 illustrate the step-by-step process by showing computer monitor displays of the process. FIG. 3 illustrates the instruction of the selection of the images. FIG. 5 illustrates the selection of the left image. FIG. 6 illustrates the selection of the right image. FIG. 7 provides the selection of auto alignment or manual alignment. FIG. 8 illustrates the selection of the click points. FIG. 8 illustrates the shutter glass display. FIG. 10 illustrates the Grey Anaglyph display and FIG. 11 illustrates the Color Anaglyph display.

The illustrative embodiments and modifications thereto described hereinabove are merely exemplary. It is understood that other modifications to the illustrative embodiments will readily occur to persons of ordinary skill in the art. All such modifications and variations are deemed to be within the scope and spirit of the present invention as will be defined by the accompany claims.

What is claimed is:

1. A method of stereoscopic image process on a networked computer system:
    loading a first image;
    loading a second image;
    color matching said first and second image;
    stereoscopically aligning said first and second images recursively through a return loop by selecting a zero parallax point and adjusting the registration points of the images recursively;
    morphine said images into a stereoscopic pair of images;
    reducing crosstalk between said stereoscopically aligned images; and
    displaying a stereoscopic image of said first and second images.

2. A stereoscopic metamorphis process for converting one image into a stereoscopic image comprising:
    retrieving a 2D image;
    loading said 2D image;
    selecting and applying a depth metamorphis processor iteratively;
    displaying said 2D image as a 3D image, said 3D image composed of a depth map processed by iterative depth metamorphis;
    morphing said images into a stereoscopic pair of images;
    applying cross talk reduction algorithms iteratively;
    modifying color and contrast attributes; and
    displaying said 3D image.

* * * * *